Nov. 7, 1939.  H. BAADE  2,179,368
GEAR SHIFTING MECHANISM FOR MOTOR VEHICLES
Filed Sept. 3, 1938  3 Sheets-Sheet 1
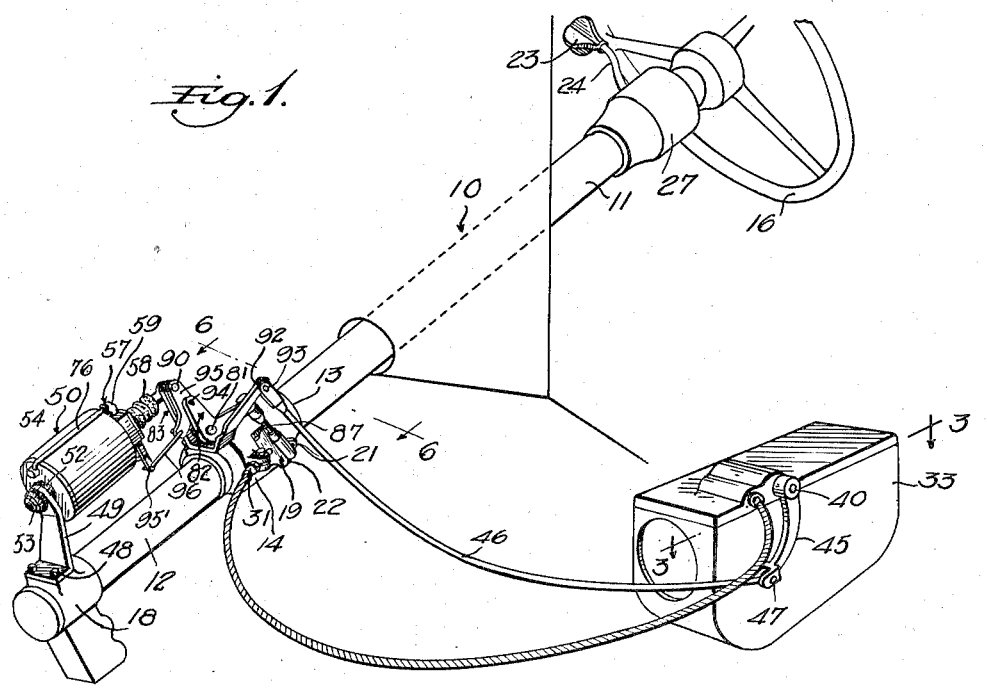
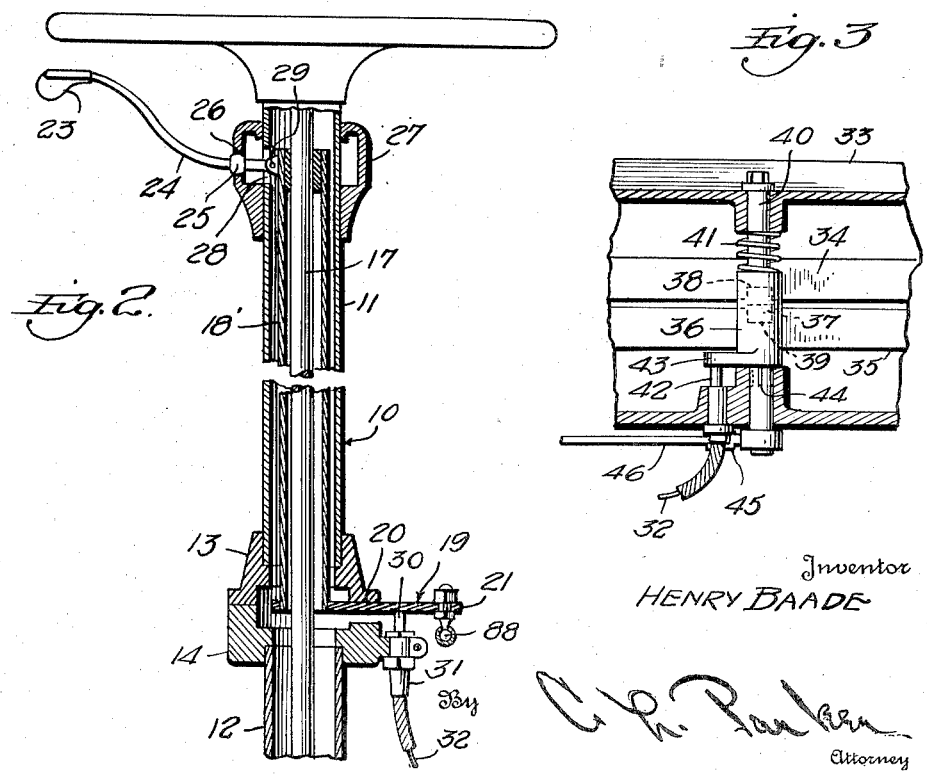
Inventor
HENRY BAADE

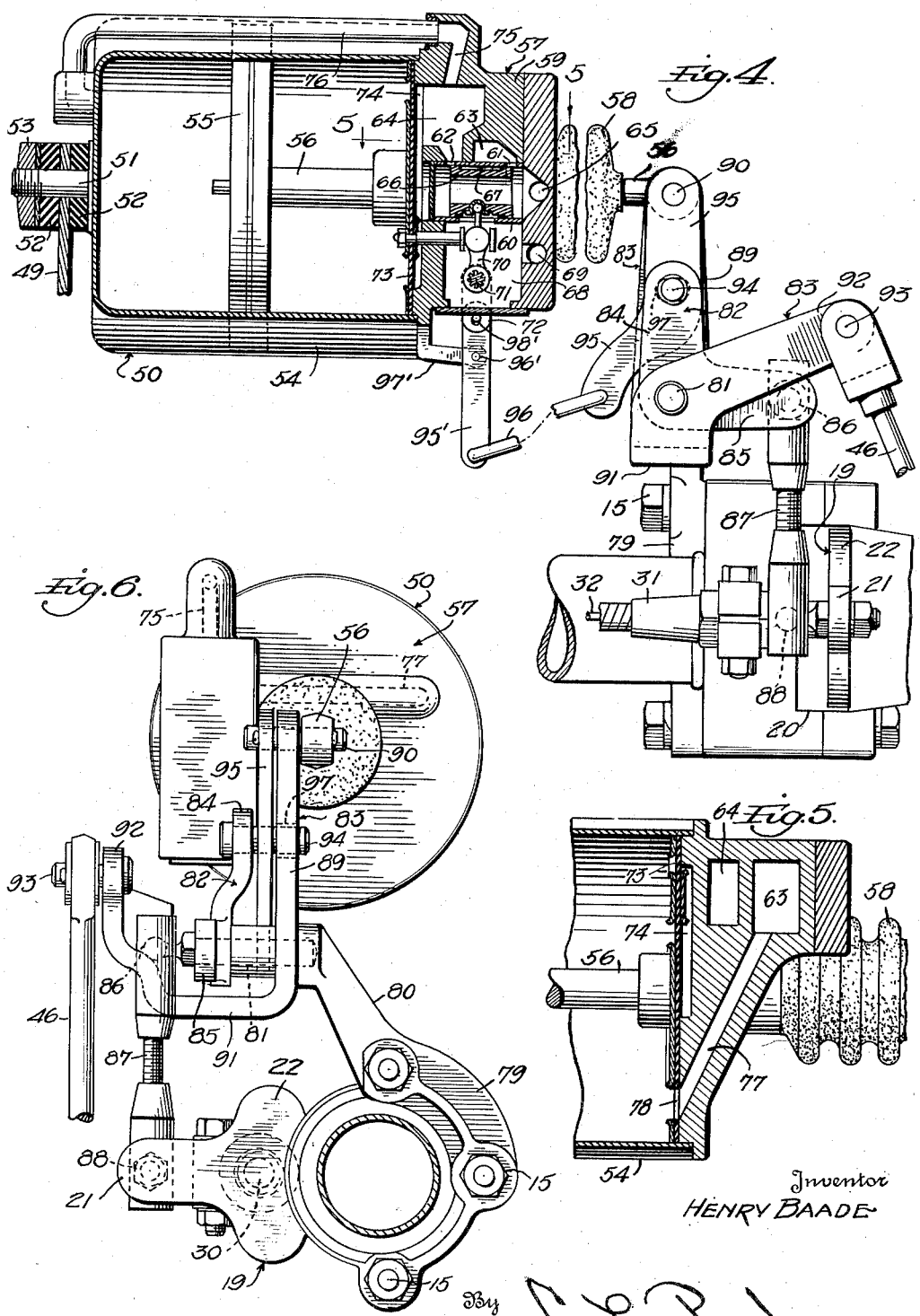

Nov. 7, 1939.  H. BAADE  2,179,368
GEAR SHIFTING MECHANISM FOR MOTOR VEHICLES
Filed Sept. 3, 1938   3 Sheets-Sheet 3
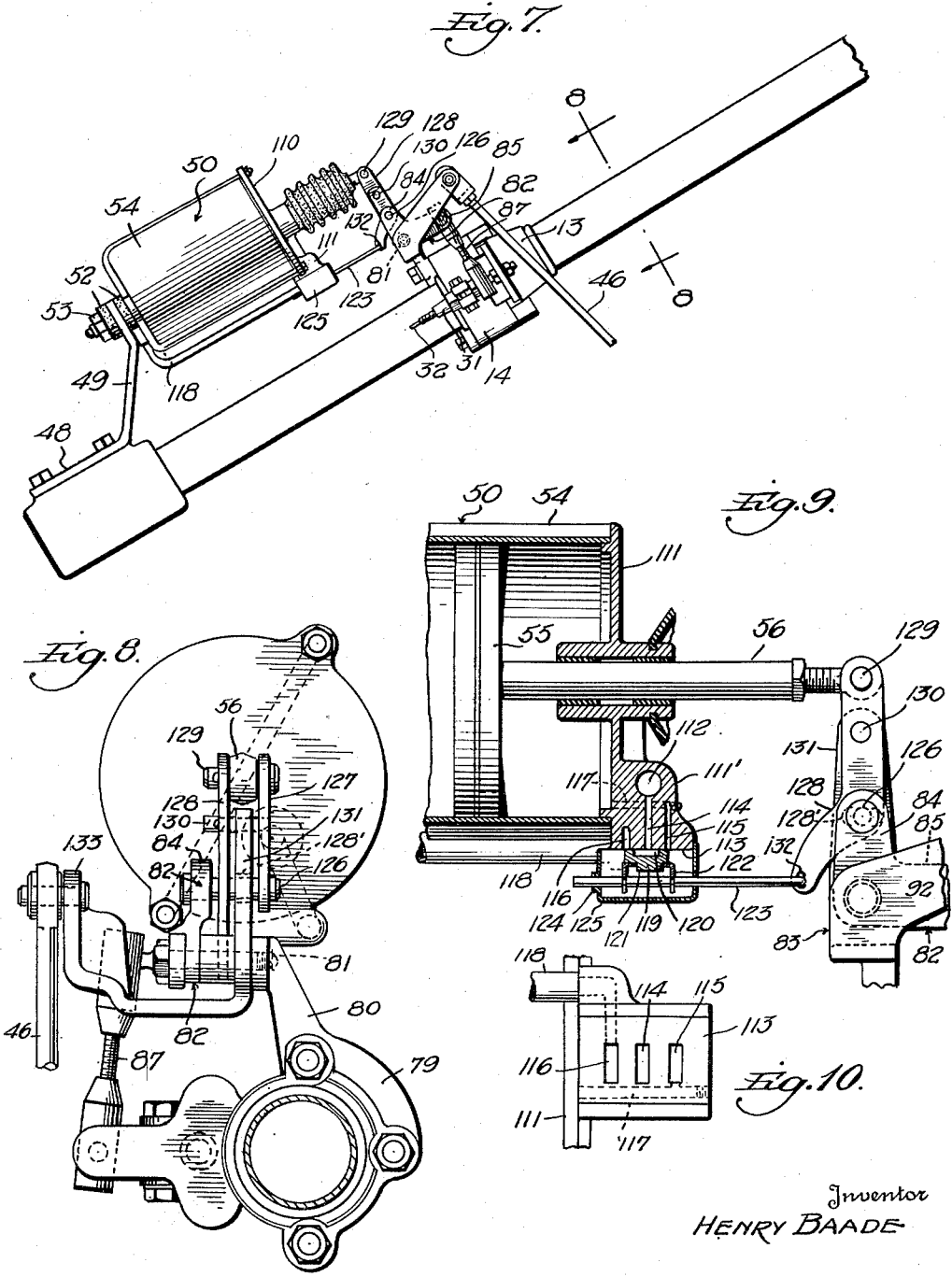
Inventor
HENRY BAADE
By
Attorney Patented Nov. 7, 1939

2,179,368

UNITED STATES PATENT OFFICE 2,179,368

GEAR SHIFTING MECHANISM FOR MOTOR VEHICLES

Henry Baade, Detroit, Mich., assignor to Automatic Shifters, Inc., Richmond, Va., a corporation of Virginia Application September 3, 1938, Serial No. 228,441

22 Claims. (Cl. 74—335)

This invention relates to gear shifting mechanisms for motor vehicles.

In my copending application Serial No. 212,591, filed June 8, 1938, I have shown and described a gear shifting mechanism for motor vehicles wherein a fluid pressure motor and its control valve mechanism are supported with respect to the steering column with the valve mechanism connected to be operated by a handle arranged adjacent and beneath the steering wheel. Such organization of elements was found highly satisfactory and efficient in operation. In the prior construction referred to, the fluid pressure shifting motor was mounted with its axis prependicular to the axis of the steering column and various levers and linkages were provided for delivering power from the motor to perform the shifting operation and to connect the motor to the valve mechanism to provide a follow-up action with respect to the shifting handle so that the degree of shifting movement would be always proportionate to the movement imparted to the control handle.

An important object of the present invention is to provide an apparatus generally similar to the structure of my copending application referred to, but wherein the shifting motor is mounted parallel to the steering column instead of perpendicular thereto to provide certain advantages such as simplicity of construction with a minimum number of parts, easy installation, etc.

A further object is to provide a mechanism of the character referred to wherein the entire assembly of the shifting motor and its valve mechanism, and the various lever devices associated with the valve mechanism and the motor are supported at two points with respect to the steering column by bracket elements, one of which is connected to one end of the motor and the other of which supports the lever elements adjacent the other end of the motor.

A further object is to provide a mechanism of the character referred to wherein the bracket which is connected to and supports one end of the motor is constructed to permit the motor to partake of swinging movement whereby the piston rod at the other end of the motor is adapted to accommodate itself to the position of its pivotal connection with one of the levers referred to.

A further object is to provide a simple bell crank lever for delivering power from the shifting handle to the lever system and which lends itself to various types of operating and controlling mechanisms for the valve and for delivering power from the motor to the gear set, A further object is to provide an organization of elements which includes a motor support having a portion thereof serving as the cover plate for the gears of the steering apparatus whereby a single element serves both as a cover plate for the steering gears and for supporting the shifting motor.

Other objects and advantages of the invention will become apparent during the course of the following description.

In the drawings I have shown two embodiments of the invention. In this showing:

Figure 1 is a perspective view of the mechanism associated with certain parts of a motor vehicle, the view being taken looking rearwardly from the forward end of the vehicle, Figure 2 is an axial sectional view through a portion of the steering column, parts being shown in elevation and parts being broken away, Figure 3 is a horizontal fragmentary sectional view through a portion of the transmission, taken substantially on line 3—3 of Figure 1, Figure 4 is a sectional view taken through the motor longitudinally thereof and passing axially through the control valve, parts being broken away, and showing the leverage system associated with the motor and a portion of the steering column, Figure 5 is a detail fragmentary sectional view through a portion of the motor head, taken substantially on line 5—5 of Figure 4, Figure 6 is a section on line 6—6 of Figure 1, Figure 7 is a side elevation of a modified form of the invention shown applied to a steering column, Figure 8 is a section on line 8—8 of Figure 7, Figure 9 is a fragmentary sectional view through the motor and valve mechanism and associated elements of the modified form of the invention, and, Figure 10 is a face view of the valve seat showinyg the arrangement of the ports therein.

Referring to the drawings the numeral 10 designates a steering column as a whole formed in the present instance of upper and lower sections 11 and 12 connected by complementary collars 13 and 14 which are secured together by screws or bolts 15. A steering wheel 16 is mounted at the upper end of the steering column and is connected to the usual steering shaft 17 leading to a housing 18 containing the usual gearing for transmitting turning movement of the shaft 17 to the front wheels of the vehicle.

A tubular member 18' is mounted within the steering column section 11 and is provided at its lower end with a crank member 19 projecting through an opening 20 formed in the member 13. The crank member 19 is provided with an end 21 projecting radially with respect to the steering column and is provided adjacent the steering column with a portion 22 enlarged transversely of the crank member for a purpose to be described.

A control handle 23 is arranged beneath the steering wheel and is connected to an arm or lever 24 having a ball member 25 arranged in an opening 26 in a housing 27 mounted at the upper end of the steering column. The inner end of the lever 24 extends through an opening 28 elongated longitudinally of the steering column, and the inner end of the lever is pivotally connected as at 29 to the upper end of the sleeve 18'.

The sleeve 18', crank member 19, handle member 23 and the lever arm 24 may be constructed in accordance with the disclosure in my copending application referred to. Downward movement of the sleeve 18' incident to upward movement of the handle 23 depresses a button 30 carried by a stationary sleeve 31 and connected to a Bowden wire 32, and the purpose of such operation will be referred to later.

Referring to Figures 1 and 3, the numeral 33 designates a transmission having a low and reverse gear shift rail or similar element 34 and a second and high gear shiftable element 35. A sleeve 36 extends transversely of the transmission and is provided with a depending finger 37 selectively engageable in notches 38 and 39 in the respective shift rails. The sleeve 36 is mounted on a shaft 40 extending transversely of the transmission, and a spring 41 urges the sleeve 36 to a position engaging the finger 37 with the notch 39 of the second and high gear shift rail 35. The Bowden wire 32 is connected to operate a button 42 engaging the lateral projection 43 carried by the sleeve 36 whereby downward movement of the crank member 19 in the manner described will slide the sleeve 36 to engage the notch 38 and thus prepare the low and reverse gear shiftable member 34 for operation.

The sleeve 36 is splined to the shaft 40 as at 44 whereby turning movement of the shaft will rock the sleeve 36 and thus actuate one of the shift rails, depending upon the selected position of the sleeve 36. In order to effect rocking movement thereof, the shaft 40 is provided with a crank 45 to which one end of an operating link 46 is pivotally connected as at 47.

Referring to Figure 1 it will be noted that the gear housing 18 is provided with a cover plate 48 which has one end extended upwardly at an angle as at 49 to form a bracket for supporting a fluid pressure motor indicated as a whole by the numeral 50. In order to connect the motor to the bracket 49 to permit swinging movement of the motor for a purpose to be described, the motor is provided with a shank 51 (Figure 4) surrounded by a pair of rubber or similar washers 52 between which the end of the arm 49 is clamped by a nut 53.

The motor 50 comprises a cylinder 54 having a piston 55 reciprocable therein and connected to a piston rod 56 extending through a preferably cast head 57 which is at the end of the motor opposite the bracket 49. The piston rod is connected to transmit movement to the link 46 and thus effect the shifting of the gears in a manner to be described, and in order to exclude dust from the bearing of the piston rod 56, the latter is preferably surrounded by a collapsible rubber boot 58.

In the form of the invention shown in Figures 1 to 7 inclusive, the valve mechanism for controlling the motor is mounted in the head 57. Referring to Figure 4, the numeral 59 designates an enlargement preferably formed integral with the head 57 and provided with a sleeve 60 ported as at 61 and 62 to communicate with spaces 63 and 64 respectively. The space within the sleeve 61 communicates with the atmosphere through a suitable passage 65 to admit air to the spaces 63 and 64 under conditions to be described. A tubular valve 66 is slidable in the sleeve 60 and is surrounded intermediate its ends by a space 67 communicating with a space 68 within the cylinder head, the latter space being in constant communication through a port or passage 69 with the intake manifold of the motor vehicle engine or other source of vacuum.

Both of the ports 61 and 62 are normally in slight communication with the atmosphere when the valve is in its neutral position shown in Figure 4 to balance pressures on opposite sides of the piston 55 in a manner to be described. Upon slight movement of the valve in either direction, one of the ports 61 or 62 will be disconnected from the atmosphere and connected to the source of vacuum through the space 67.

The valve 66 is operated by a crank arm 70 carried by a shaft 71 extending externally of the enlargement 59 and provided at its outer end with a crank 72. Between the valve head 57 and the interior of the cylinder 54 a flexible diaphragm 73 is mounted, the inner face of the diaphragm being influenced by pressure in the adjacent end of the cylinder 54 and the other face of the diaphragm being influenced by pressure in an annular space 74 which communicates with the opposite end of the cylinder 54, through the space 64, through a passage 75 and through a pipe 76 leading to the opposite end of the cylinder. The space 63 communicates with the adjacent end of the cylinder 54 through a passage 77 (Figure 5) which leads through an opening 78 formed in the diaphragm 73.

The complementary member 14 carries a bracket 79 (Figures 4 and 6) secured thereto by two of the bolts 15. This bracket is provided with an angularly extending arm 80 the end of which is provided with a stub shaft 81 acting as a fixed pivot for a pair of levers 82 and 83. The lever 82 is in the form of a bell crank having two arms 84 and 85 the latter of which is universally connected as at 86 to one end of a link 87 which has its other end universally connected as at 88 to the lever member 19. The two universal connections 86 and 88 may be in the form of conventional balls and sockets.

The lever 83 is double armed as shown in Figure 6 one arm 89 of this lever being pivotally connected by a pin 90 to the end of the motor piston rod 56. The lever 83 extends transversely beneath the pivot pin 81 as at 91 and has its other arm 92 extending upwardly with respect to the steering column at a slight angle thereto. The end of such arm of the lever is pivotally connected as at 93 to the other end of the link 46.

The upper end 84 of the bell crank lever 82 is pivotally connected as at 94 to a floating lever 95 intermediate the ends thereof, the upper end of the lever 95 being connected to the pivot pin 90 to be moved thereby upon movement of the piston rod 56. The lower end of the lever 95 is connected to one end of a link 96, and the other end of this link is connected to one end of a lever 95'. The pivot pin 94 extends through a slot 97 formed in the lever arm 89 and elongated transversely thereof. Thus within the limits of the slot 97, turning movement of the bell crank lever 82 will actuate the floating lever 95 without transmitting any movement to the lever arm 89. The lever 95' is pivotally supported intermediate its ends as at 96' on the end of a suitable bracket 97' and the other end of the lever 95' has a pin and slot connection as at 98' with the end of the crank 72.

In the form of the invention described above, the valve mechanism and its associated diaphragm 73 are similar to the corresponding elements of my copending application referred to above and form no part per se of the present invention. The diaphragm is acted upon by differential pressures in opposite ends of the motor cylinder 54 to transmit to the handle 23 a "feel" corresponding to the resistance encountered in each shifting operation. In the form of the invention shown in Figures 7 to 10 inclusive an entirely different type of valve mechanism and "feel" means is employed, although the general arrangement of the combination of the various units which go to make up the apparatus are similar to the form of the invention previously described. Since a number of the elements in the modified form of the invention are identical with those previously described, they need not be described in detail and will be indicated by the same reference numerals.

The motor 50 is shown in Figures 8 and 10 as being provided with a head 111 enlarged at one side as at 111' to form a valve body having a vacuum passage 112 therein. The valve body 111' has one face machined as at 113 to form a valve face in which is formed a passage 114 communicating with the vacuum passage 112. On opposite sides of the passage 114, the valve body is provided with passages 115 and 116 extending through the valve face 113. The passage 115 communicates with the adjacent end of the cylinder through a passage 117 while the passage 116 communicates with the opposite end of the motor cylinder through a pipe 118.

As shown in Figure 9, a D-valve 119 controls the passages 114, 115 and 116 and is provided with a recess 120 movable to connect the vacuum passage 114 with either of the passages 115 or 116. A lug 121 carried by the valve 119 is engaged by a preferably stamped sheet metal actuator 122 connected to an operating rod 123, the portions of the actuator 122 which engage the valve resiliently urging the valve against its seat. The rod 123 operates in a bearing 124 formed in a sheet metal casing 125, the interior of this casing communicating with the atmosphere to admit air into one of the openings 115 or 116 when the other of such openings is in communication with the vacuum passage 114.

The arm 84 of the bell crank lever 82 is connected by a pivot pin 126 to a pair of levers 127 and 128 arranged in spaced parallel relation and pivotally connected at their upper ends as at 129 to the piston rod 56. A pivot pin 130 connects both levers 127 and 128, between the pivot pins 126 and 129, to one arm 131 of a double-armed lever generally similar to the lever 83 previously described. As in the previous case, this lever and the bell crank lever 82 are carried by the pivot pin 81 which is, in turn carried by the bracket arm 80. The pivot pin 126 extends through a slot 128' formed in the lever arm 131 and elongated transversely thereof. Accordingly the pivot pin 126 is free to move transversely of the lever arm 131, within the limits of the slot 128', without transmitting any movement to the lever arm 131. The lever 128 is similar in form to the lever 95 previously described, the lower end of the lever being offset and connected to the valve operating rod 123. This connection preferably includes a slot 132 for the reason that the rod 123 partakes of linear movement while the lever 128 partakes of swinging movement during its operation. It will be apparent that the other arm 133 of the double-armed lever may be identical with the arm 92 of the similar lever previously described, and is similarly connected to the link 46.

The operation of the form of the invention shown in Figures 1 to 6 inclusive is as follows:

The valve mechanism shown in Figure 4 is similar to and operates in the same manner as the valve mechanism shown in my copending application Serial No. 212,591, and need not be described in detail. When it is desired to shift into low gear, the operator lifts the handle 23 toward the steering wheel, thus effecting downward movement of the tubular member 18' (Figure 2) and corresponding movement of the lever member 19. Thus the button 30 is depressed to move the Bowden wire 32 and this movement will cause the button 42 (Figure 3) to push the projection 43 and slide the sleeve 36 against the tension of the spring 41 to engage the finger 37 in the notch 38 of the low and reverse gear shift rail 34. Thus, upon rocking movement of the shaft 40, the finger 37 will be rocker to move the shift rail 34 to the desired gear position.

Assuming that the shift is to be made to low gear, as stated, the operator will pull the handle 23 downwardly and rearwardly parallel to the plane of the steering wheel after having lifted it to select the shift rail 34 in the manner described. Downward and rearward movement of the handle 23 turns the lever member 19 in a counter-clockwise direction as viewed in Figure 1 and in a clockwise direction as viewed in Figure 6. The link 87 turns the bell crank lever 82 in a counter-clockwise direction as viewed in Figures 1 and 4, and since the motor, at this time will be inoperative, the pivot pin 90 will remain stationary and the pivot pin 94 will swing the floating lever 95 in a clockwise direction as viewed in Figures 1 and 4. The lever 95, turning about the pivot 90, will move the link 96 toward the left as viewed in Figures 1 and 4 and the valve 66 also will be moved toward the left as viewed in Figure 4. It will be apparent that the lever 95' acts as reversing means between the link 96 and crank 72 whereby movement of the link 96 in either direction will result in movement of the valve 66 in the same direction.

The vacuum space 67 of the valve will be placed in communication with the opposite end of the motor cylinder through the port 62, passage 75 and pipe 76. At the same time, movement of the valve 66 toward the left will increase communication of the adjacent or right hand end of the cylinder (Figure 4) with the atmosphere through port 61, space 63 and passage 77 (Figure 5). Accordingly the piston 55 will start to move toward the left and corresponding movement will be imparted by the pin 90 to the lever arm 89 and to the upper end of the floating lever 95.

If the operator should arrest movement of the handle in the direction desired, the pivot pin 94 (Figure 4) immediately becomes stationary, whereupon slight further movement of the piston 55 to the left will cause the pivot pin 90 to turn the lever 95 in a counter-clockwise direction about the pivot pin 94, thus moving the link 96 toward the right and imparting similar movement to the valve 66 to return it to neutral position.

Accordingly it will be apparent that movement of the handle 23 is accompanied by proportional movement of the piston 55, the leverage mechanism forming a follow-up means to cause the valve to control the piston 55 for movement in accordance with the movement of the handle 23. Assuming that the handle 23 is moved fully into the low gear position before being stopped, the motor will continue its operation and the shift rail 34 will be shifted into the low gear position. The lever 83 is, in effect, a bell crank lever having one arm 89 connected to the piston rod and the other arm 92 connected to the rod 46. Thus every movement of the piston rocks the lever 83 and transmits movement to the shift crank 45 (Figure 1) to actuate the selected shift rail.

It will be unnecessary to completely explain every operation of the apparatus for providing different gear shifting movements. For shifting from low gear into neutral, or from neutral position into either second or reverse gear, the handle 23 will be moved upwardly and forwardly parallel to the plane of the steering wheel in which case the control valve mechanism will operate in a manner opposite to that described for low gear. In other words, movement of the handle 23 forwardly and upwardly parallel to the plane of the steering wheel will cause the lever member 19 to turn in a counter-clockwise direction as viewed in Figure 6, thus pulling downwardly on the bell crank lever arm 85, the pin 94 turning the floating lever 95 toward the right as viewed in Figure 4 about the pivot 90. The valve 66 likewise will be moved to the right to connect the vacuum space 67 to the port 61, thus connecting the adjacent end of the cylinder to the intake manifold while the remote end of the cylinder will be connected to the atmosphere through the port 62. Thus the piston 55 will move to the right, and the pin 90 will be caused to travel in the same direction as the pin 94, namely, toward the right as viewed in Figure 4, to provide the desired follow-up action and cause the piston to travel a distance proportional to the distance of travel of the handle 23.

Of course, movement from neutral position into reverse gear position will take place by initially moving the handle 23 upwardly at right angles to the plane of the steering wheel before swinging it upwardly and forwardly parallel to the plane of the steering wheel. When the handle 23 is in neutral position, the spring 41 (Figure 4) acting through the sleeve 36, button 42, Bowden wire 32, crank member 19 and sleeve 18' will bias the handle 23 away from the steering wheel to a position in which a shift may be made into either second or high gear. The action of the spring 41 likewise retains the finger 37 in engagement with the notch 39, thus selecting the second and high gear shift rail 35 for operation when the handle 23 is in its biased position.

The arrangement of the motor 50 parallel to the steering column provides a compact arrangement of parts which permits ready installation and accessibility and greatly simplifies the structure as a whole. For example, for all of the working parts of the apparatus shown in Figure 1 only two supports are necessary, namely, the bracket 49 and the bracket 79 and its arm 80 (Figure 6). The bracket 49 supports the adjacent end of the motor and permits it to partake of the swinging movement necessary to permit the pivot pin 90 (Figure 4) to turn about the axis of the pivot pin 81. The bracket arm 80 supports all of the mechanism and, through the lever arm 89, supports the adjacent end of the motor through its connection with the free end of the piston rod. Thus it will be apparent that a simplified form of lever mechanism is employed and the entire assembly of the lever means, the motor, its control valve and the follow-up means connecting the control valve to the lever means is supported in a simple manner at two points along the steering column. It also will be apparent that a single element may be employed both as the cover plate for the steering gears within the housing 18 and as the support for the adjacent end of the motor 50.

In the form of the invention shown in Figure 7 a different and simplified form of valve mechanism is employed for the motor, but the essential features of both forms of the invention are the same. It will be noted that as in the form previously described, the modified form of the invention provides two supporting means for the motor-lever assembly, namely, the bracket 49 and the bracket arm 80. The manually operable mechanism also is the same for both forms of the invention down to and including the bell crank lever 82, which is identical with the same bell crank lever in the form of the invention previously described. The modified form of the invention, as distinguished from the form previously described, provides a different type of valve mechanism and substitutes mechanical "feel" means for resisting the operation of the shifting handle instead of using the diaphragm 73 to provide resistance against the handle proportionate to the differential pressures in the motor. Therefore, it will be apparent that both forms of the invention have a number of features in common, but such features are quite flexible in their adaptability to different types of valve means and means for providing resistance to movement of the manually operable handle.

Selection of either shift rail for operation is the same in Figures 7 to 10 inclusive as in Figures 1 to 6 inclusive, and need not be referred to. The same handle is used as in the form of the invention previously described, and such handle, when moved to the low gear position, turns the bell crank lever 82 in a counter-clockwise direction as viewed in Figure 7, thus turning the float-levers 127 and 128 about the pivot 129 to move the valve 119 to the left as viewed in Figure 9. This action connects the vacuum passage 114 to the port 116 and thus to the remote end of the cylinder 54 through the pipe 118. At the same time, movement of the valve 119 to the left uncovers the port 115 to the atmosphere, thus admitting air into the adjacent end of the cylinder and causing the piston 55 to move toward the left as viewed in Figure 9.

This action causes the piston rod 56 to move the pivot pin 129 toward the left as viewed in Figure 9, thus tending to reverse the previously described movement of the lever 128 to tend to return the valve 119 to its normal position. Whenever movement of the manually operable handle is arrested movement of the lever 128 will restore the valve 119 to neutral position and thus balance pressures in opposite ends of the motor cylinder to arrest the movement of the piston 55.

The described operation of the motor and its control mechanism takes place for both first and high gears, and the reverse of this operation takes place for second and reverse gears. When shifting into either second or reverse gears the manually operable handle will be moved upwardly and forwardly parallel to the plane of the steering wheel as described in connection with Figure 1, thus turning the bell crank lever 82 in a clockwise direction to swing the levers 127 and 128 in a counter-clockwise direction about the pivot 129 to move the valve 119 toward the right. This operation connects the port 115 to the vacuum space 120, while air will be admitted into the remote end of the cylinder 54 and the piston 55 will be moved toward the right as viewed in Figure 9. When movement of the bell crank lever 82 is arrested, slight movement of the pivot pin 129 toward the right will restore the valve 119 to its neutral position and arrest the movement of the piston.

Accordingly it will be apparent that the lever means employed in Figures 7, 8 and 9 provides an effective follow-up action for the control valve 119, as is true of the form of the invention previously described, whereby the piston 55 will be caused to move a distance proportional to the distance of movement of the manually operable handle. However, it will be apparent that power is delivered to the rod 46 in a somewhat different manner. Upon the application of manual force to the pivot pin 126 through the bell crank lever 82 to move it in one direction, the motor will be actuated to move the pin 129 in the same direction. Therefore, force will be applied at two points to the levers 127 and 128 to move the pivot pin 130 and thus turn the lever arm 131, and this operation swings the lever arm 133 to effect the shifting action.

Accordingly, the operator, in moving the pivot pin 126, works against the tendency of the motor to swing the levers 127 and 128 about the pivot pin 130, and the force which the operator must exert will be dependent upon the force developed by the motor 50. In turn, the force developed by the motor will depend upon the resistances encountered by the motor in performing the shifting operation. For example, assuming that the operator moves the manually operable handle at a given speed the motor piston will tend to operate at a corresponding speed, but movement of the motor piston will be retarded when increased shifting resistance is encountered. Accordingly the turning movement imparted by the operator to the bell crank lever 82 will open the valve 119 to a greater extent, thus increasing the differential pressures in the motor and causing the motor piston to exert a greater force against the pin 129. This greater force must be overcome by the operator in maintaining the valve 119 in open position, according to the direction of movement of the parts, and thus it will be apparent that the greater the resistance encountered by the motor, the greater will be the force developed by the motor, and consequently the greater will be the resistance felt by the operator in performing the shifting operation. Moreover, turning movement of the pin 130 about the axis of the pivot pin 81 is accomplished by the exertion of forces to the pins 129 and 126, and accordingly the operator and the motor each perform a portion of the work required for the shifting operation, the proportions depending upon the position of the pin 130 with respect to the pins 126 and 129.

From the foregoing it will be apparent that the present invention provides a highly efficient follow-up shifting mechanism wherein the shifting action is accurately controlled by the operator through the handle 23 and wherein the operator can "feel" his way past the various resistances encountered in shifting the gears of a motor vehicle. For example, the spring detents provided in conventional transmissions for tending to hold each shift rail in its neutral or either of its gear positions provides some resistance against the shifting operations, and when shifting from neutral into a gear position the synchronizing means, when such means are employed, also tend to resist the shifting operation. In a conventional manually shiftable mechanism the operator feels each resistance as it is encountered and controls the shifting operation accordingly. In the present construction each resistance is likewise felt by the operator to enable him to control each shifting operation as accurately as can be done with a conventional shifting mechanism. While the valve mechanisms and the "feel" means for the two forms of the invention illustrated are wholly different from each other, either form of either of such means may be employed with the general combination of parts referred to, such combination providing novel structural features which facilitate installation, operation and accessibility of the various parts while maintaining a high degree of simplicity in the apparatus.

In each form of the apparatus, the parts which are completely manually operable are identical from the handle down to and including the bell crank lever 82. In both forms of the apparatus, the motor-lever assembly is supported at two points along the steering column, namely, by the bracket 49 and by the bracket arm 80, regardless of the particular valve mechanism or "feel" means employed. Thus it will be apparent that the general combination involved is highly flexible in its adaptability to different "feel" means and different valve mechanisms without destroying the highly desirable characteristics of the apparatus as a whole.

In each form of the apparatus, the lever means employed provides for a novel follow-up action for the valve mechanism, as described. Moreover, each form of the apparatus is such that upon a failure of power in the motor, the shifting of the gears may be accomplished manually, thus preventing the vehicle from being stalled. In the form of the invention shown in Figures 1 to 6 inclusive, the normal follow-up action takes place with the pin 94 operating within the limits of the slot 97 formed in the lever arm 89. If for any reason the motor should fail to operate, the lever 83 may be turned by movement of the handle 23 until the pin 94 engages one end of the slot 97, whereupon, by the exertion of substantially greater force than is required during the normal operation of the apparatus, the operator may manually move the lever 83 to perform the shifting operation.

The arrangement of the pin 126 and slot 128' in Figures 7, 8 and 9 is for the same purpose. If the motor fails to operate upon manual operation of the bell crank lever 82, the pin 126 may be moved to one end of the slot 128', whereupon the operator may manually swing the lever arm 131 to perform the desired shifting operation. Accordingly the present apparatus embodies every desirable characteristic of operation of a power gear shifting mechanism with an apparatus which is characterized by simplicity, ease of installation and operation, and ready accessibility to all of the parts associated with the steering column.

It will be noted that the shifting motor and the various levers associated therewith, including the gear shift lever 45, are all arranged to move in vertical planes extending longitudinally of the vehicle. Thus all motion is transmitted in such planes, thus minimizing the transmission of power around corners, while utilizing the other advantageous features of the system such as simplicity, accessibility, etc., and the elimination of the shifting motor from a position adjacent the gear set.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. In a motor vehicle, the combination with a steering column and a transmission having a member shiftable to provide different gear ratios, of a pair of supports carried by the steering column, a fluid pressure motor connected to one of said supports, control valve mechanism for said motor, a lever assembly supported by the other of said supports, a manually operable element, means connecting said element, said motor and said valve mechanism to said lever assembly to cause said valve mechanism to be actuated upon movement of said manually operable element and to partake of a follow-up action with respect to said motor upon operation thereof, and means connected to transmit movement of said motor through portions of said lever assembly to said shiftable member.

2. In a motor vehicle, the combination with a steering column and a transmission having a member shiftable to provide different gear ratios, of a pair of supports carried by the steering column, a fluid pressure motor having a pressure responsive member therein and a rod connected to such member and projecting from one end of the motor, said motor being arranged substantially parallel to the steering column and connected at one end to one of said supports, control valve mechanism for said motor, a lever assembly supported by the other of said supports, a manually operable element, means connecting said element, said motor and said valve mechanism to said lever assembly to cause said valve mechanism to be actuated upon movement of said manually operable element and to partake of a follow-up action with respect to said motor upon operation thereof, and means connected to transmit movement of said pressure responsive member through portions of said lever assembly to said shiftable member.

3. In a motor vehicle, the combination with a steering column and a transmission having a member shiftable to provide different gear ratios, of a pair of supports carried by the steering column, a fluid pressure motor connected to one of said supports, control valve mechanism for said motor, a lever assembly, a fixed pivot carried by the other support and supporting said lever asembly, said lever assembly being connected and arranged with respect to said manually operable element, said motor and said valve mechanism to cause said valve mechanism to be actuated upon movement of said manually operable element and to partake of a follow-up action with respect to said motor upon operation thereof, and means connected to transmit movement of said motor through portions of said lever assembly to said shiftable member.

4. In a motor vehicle, the combination with a steering column and a transmission having a member shiftable to provide different gear ratios, of a pair of supports carried by the steering column, a fluid pressure motor connected to one of said supports, control valve mechanism for said motor, a lever assembly, a fixed pivot carried by the other support and supporting said lever assembly, at least one of said levers being connected to transmit a manual movement to said valve mechanism and connected to be moved by said motor, and being connected to another lever to provide a follow-up action of said valve upon operation of said motor, and means connected to transmit movement of said motor through portions of said lever assembly to said shiftable member.

5. In a motor vehicle, the combination with a steering column and a transmission having a member shiftable to provide different gear ratios, of a manually operable element supported with respect to the steering column, a fluid pressure motor having a pressure responsive member projecting from one end thereof, a support carried by the steering column and supporting the other end of said motor, a second support carried by the steering column, a power lever pivotally supported by said second support and connected to be operated by said pressure responsive member, a follow-up valve for controlling said motor, a valve lever connected respectively to said valve, said pressure responsive member and said power lever, and means for transmitting power from said power lever to said shiftable member.

6. In a motor vehicle, the combination with a steering column and a transmission having a member shiftable to provide different gear ratios, of a manually operable element supported with respect to the steering column, a fluid pressure motor having a pressure responsive member projecting from one end thereof, a support carried by the steering column and supporting the other end of said motor, a second support carried by the steering column, a power lever pivotally supported by said second support and connected to be operated by said pressure responsive member, a follow-up valve for controlling said motor, a valve lever connected respectively to said valve, said pressure responsive member and said power lever, means connecting said motor to said first named support to permit swinging movement of said motor in accordance with the position of said valve lever, and means for transmitting power from said power lever to said shiftable member.

7. In a motor vehicle, the combination with a steering column and a transmission having a member shiftable to provide different gear ratios, of a manually operable element supported with respect to the steering column, a fluid pressure motor arranged parallel to the steering column and having a pressure responsive member projecting from one end thereof, a support carried by the steering column and connected to flexibly support the other end of said motor, a second support carried by said steering column and provided with a pivot element, a power lever mounted on said pivot element and connected to be operated by said pressure responsive member, a follow-up valve for controlling said motor, a valve lever connected respectively to said valve, said pressure responsive member and said power lever, and means for transmitting power from said power lever to said shiftable member.

8. In a motor vehicle, the combination with an inclined steering column and a transmission having a member shiftable to provide different gear ratios, of a manually operable element supported with respect to the steering column, a fluid pressure motor arranged parallel to the steering column and having a pressure responsive member projecting from its upper end, a support carried by said steering column and supporting the lower end of said motor, a second support carried by the steering column above the upper end of said motor, a power lever pivotally supported by said second support and operable by said pressure responsive member, a follow-up valve for controlling said motor, a valve lever connected respectively to said valve, said pressure responsive member and said power lever, and means for transmitting power from said power lever to said shiftable member.

9. In a motor vehicle, the combination with an inclined steering column and a transmission having a member shiftable to provide different gear ratios, of a manually operable element supported with respect to the steering column, a fluid pressure motor arranged parallel to the steering column and having a pressure responsive member projecting from its upper end, a support carried by said steering column and supporting the lower end of said motor, a second support carried by the steering column above the upper end of said motor, a power lever pivotally supported by said second support and operable by said pressure responsive member, a follow-up valve for controlling said motor, a valve lever connected respectively to said valve, said pressure responsive member and said power lever, means flexibly connecting the lower end of said motor to said first named support to permit said motor to alter its position in accordance with the position of said valve lever, and means for transmitting power from said power lever to said shiftable member.

10. In a motor vehicle, the combination with a steering column and a transmission having a member shiftable to provide different gear ratios, of a fluid pressure motor having a pressure responsive member projecting from one end thereof, means for flexibly supporting said motor with respect to the steering column, a supporting pivot carried by the steering column, a manually operable lever and a power lever both supported by said pivot, said power lever being operable by said pressure responsive member, a follow-up valve for controlling said motor, means for effecting a follow-up action of said valve comprising a valve lever connected respectively to said valve, said pressure responsive member and said manually operable lever, and means for transmitting power from said power lever to said shiftable member.

11. In a motor vehicle, the combination with an inclined steering column and a transmission having a member shiftable to provide different gear ratios, of a fluid pressure motor arranged parallel to the steering column and having a pressure movable member projecting from one end thereof, means carried by the steering column for flexibly supporting the other end of said motor, a supporting pivot carried by the steering column, a manually operable lever and a power lever both supported by said pivot, said power lever being operable by said pressure responsive member, a follow-up valve for controlling said motor, means for effecting a follow-up action of said valve comprising a valve lever connected respectively to said valve, said power lever, said pressure responsive member and said manually operable lever, and means for transmitting power from said power lever to said shiftable member.

12. In a motor vehicle, the combination with an inclined steering column arranged in a vertical plane longitudinally of the vehicle, and a transmission having a member shiftable to provide different gear ratios and provided with an operating lever mounted to turn in a vertical plane longitudinally of the vehicle, of a fluid pressure motor arranged parallel to and substantially in the vertical plane of the steering column and having a pressure responsive member, means for flexibly supporting said motor with respect to the steering column, a valve for controlling said motor, a leverage system comprising a plurality of levers movable parallel to the vertical plane of the steering column, said leverage system being connected and arranged to cause said valve to partake of a follow-up action with respect to said pressure responsive member, said leverage system including a power lever operable by said pressure responsive member, and means connecting said power lever to said operating lever.

13. In a motor vehicle, the combination with an inclined steering column arranged in a vertical plane longitudinally of the vehicle, and a transmission having a member shiftable to provide different gear ratios and provided with an operating lever mounted to turn in a vertical plane longitudinally of the vehicle, of a fluid pressure motor arranged parallel to and substantially in the vertical plane of the steering column and having a pressure responsive member projecting from one end thereof, means for flexibly supporting the other end of said motor with respect to the steering column, a manually operable lever, a power lever operable by said pressure responsive member, a common pivot supporting said last two levers for turning movement in planes parallel to the vertical plane of the steering column, a valve for controlling said motor, means connecting said valve to be operated by said manually operable lever and to be caused to partake of a follow-up action with respect to said pressure responsive member, and means for transmitting power from said power lever to said operating lever.

14. In a motor vehicle, the combination with a steering column and a transmission having a member shiftable to provide different gear ratios, of a fluid pressure motor arranged parallel to the steering column and having a pressure responsive member, a control valve mechanism for said motor carried by one end thereof, means for flexibly supporting said motor with respect to the steering column, a power lever and a valve operating lever both pivotally connected to said pressure responsive member, a manually operable lever, a common pivot carried by the steering column and supporting said power lever and said manually operable lever, said valve operating lever being connected to said manually operable lever and to the valve mechanism and providing a follow-up action of said valve with respect to said pressure responsive member, and means connecting said power lever to said shiftable member.

15. In a motor vehicle, the combination with a steering column and a transmission having a member shiftable to provide different gear ratios, of a fluid pressure motor arranged parallel to the steering column and having a pressure responsive member projecting from one end thereof, means for flexibly supporting the other end of said motor with respect to the steering column, a valve mechanism for controlling said motor, a power lever and a valve lever pivotally connected to each other and to said pressure responsive member, a manually operable lever, a common pivot carried by the steering column and pivotally supporting said power lever and said manually operable lever, said valve lever being connected to said manually operable lever and connected to transmit movement to said valve mechanism whereby the latter partakes of a follow-up action with respect to said pressure responsive member, and means connecting said power lever to said shiftable member.

16. In a motor vehicle, the combination with an inclined steering column arranged in a vertical plane extending longitudinally with respect to the motor vehicle, and a transmission having a member shiftable to provide different gear ratios and having an operating lever mounted to turn in a vertical plane extending longitudinally of the vehicle, of a fluid pressure motor arranged approximately in the vertical plane of the steering column having a pressure responsive member projecting from one end thereof, means for flexibly supporting said motor with respect to the steering column, a valve lever, a power lever and a manually operable lever all mounted for movement in planes parallel to the vertical plane of the steering column, said valve lever and said power lever being pivotally connected to said pressure responsive member, a common pivot carried by the steering column and pivotally supporting said power lever and said manually operable lever, said valve lever being pivotally connected to said manually operable lever and being connected to transmit movement to said valve mechanism to cause the latter to partake of a follow-up action with respect to said pressure responsive member, and power transmitting means connecting said power lever to said operating lever.

17. In a motor vehicle, the combination with an inclined steering column arranged in a vertical plane extending longitudinally with respect to the motor vehicle, and a transmission having a member shiftable to provide different gear ratios and having an operating lever mounted to turn in a vertical plane extending longitudinally of the vehicle, a fluid pressure motor arranged approximately parallel to the steering column substantially in the vertical plane thereof and provided with a pressure responsive member projecting from its upper end, means carried by the steering column for flexibly supporting the lower end of said motor, a valve for controlling said motor, a valve lever, a power lever and a manually operable lever all mounted for movement in planes parallel to the vertical plane of the steering column, said valve lever and said power lever being pivotally connected to said pressure responsive member, a common pivot carried by the steering column and supporting said power lever and said manually operable lever, said valve lever being connected to said manually operable lever and connected to transmit movement to said valve whereby the latter partakes of a follow-up action in accordance with the movement of said pressure responsive member, and motion transmitting means connecting said power lever to said operating lever.

18. In a motor vehicle, the combination with a steering column and a transmission having a member shiftable to provide different gear ratios, of a fluid pressure motor mounted substantially parallel to the steering column and provided with a pressure responsive member projecting from one end, means for flexibly supporting said motor with respect to the steering column, a valve for controlling said motor, a valve operating lever pivotally connected to said pressure responsive member, a power lever pivotally supported by the steering column and pivoted to said valve lever at a point spaced from the connection of the latter with said pressure responsive member, means for applying a manual force to said valve lever at a point spaced from the other pivot points on said lever, said valve lever being connected to said valve to cause the latter to partake of a follow-up action in accordance with movement of said pressure responsive member, and means connecting said power lever to said shiftable member.

19. In a motor vehicle, the combination with a steering column and a transmission having a member shiftable to provide different gear ratios, of a fluid pressure motor arranged substantially parallel to the steering column and having a pressure responsive member projecting from its upper end, means carried by the steering column for flexibly supporting the lower end of said motor, a common pivot carried by the steering column, a manually operable lever and a power lever both supported by said pivot, a valve lever connected to operate said valve and connected at separate points to said manually operable lever, said power lever and said pressure responsive member to cause said valve to partake of a follow-up action in accordance with the movement of the said pressure responsive member, and motion transmitting means connecting said power lever to said shiftable member.

20. In a motor vehicle, the combination with an inclined steering column arranged in a vertical plane extending longitudinally of the vehicle, and a transmission having a member shiftable to provide different gear ratios and having an operating lever mounted to turn in a vertical plane extending longitudinally of the vehicle, of a fluid pressure motor arranged approximately parallel to and substantially in the vertical plane of the steering column and provided with a pressure responsive member projecting from its upper end, a valve for controlling said motor, means carried by the steering column for flexibly supporting the lower end of said motor, a common pivot carried by said steering column perpendicular to the vertical plane thereof, a power lever and a manually operable lever both pivotally mounted on said pivot, a valve lever mounted for movement parallel to the vertical plane of the steering column and connected at spaced points to said manually operable lever, said power lever and said pressure responsive member and connected to said valve to cause the latter to partake of a follow-up action in accordance with the movement of said pressure responsive member, and motion transmitting means connecting said power lever to said operating lever.

21. In a motor vehicle, the combination with a steering column having a steering gear housing, and a transmission having a member shiftable to provide different gear ratios, of a motor connected to move said shiftable member, a support having a portion forming a cover plate for said housing and a portion connected to said motor to support the latter with respect to the steering column, and means connected to control the operation of said motor.

22. In a motor vehicle, the combination with a steering column having a steering gear housing, and a transmission having a member shiftable to provide different gear ratios, of a motor arranged parallel to the steering column and provided with a movable member, a member having one portion forming a cover plate for said housing and another portion connected to one end of said motor to form a support therefor, a motor-controlling and power-delivering mechanism supported by the steering column beyond the other end of said motor, said mechanism having a portion connected to the movable member of said motor, and means connecting said mechanism to said shiftable member.

HENRY BAADE.